United States Patent [19]

Jen et al.

[11] Patent Number: 4,598,327
[45] Date of Patent: Jul. 1, 1986

[54] SERVO CONTROL SYSTEM USING SERVO PATTERN TIME OF FLIGHT FOR READ/WRITE HEAD POSITIONING IN A MAGNETIC RECORDING SYSTEM

[75] Inventors: Shen Jen, Richardson, Tex.; William J. Kabelac, Morgan Hill, Calif.

[73] Assignee: International Business Machines Corporation, Armonk, N.Y.

[21] Appl. No.: 749,694

[22] Filed: Jun. 28, 1985

[51] Int. Cl.$^4$ ............................................. G11B 5/56
[52] U.S. Cl. .................................................... 360/77
[58] Field of Search ........................................ 360/77

[56] References Cited
U.S. PATENT DOCUMENTS

| 3,812,533 | 5/1974 | Kimura et al. | 360/77 |
| 4,149,198 | 4/1979 | Behr et al. | 360/77 |
| 4,346,413 | 8/1982 | Hack | 360/77 |
| 4,454,549 | 6/1984 | Pennington | 360/77 |
| 4,488,187 | 12/1984 | Alaimo | 360/77 |

OTHER PUBLICATIONS

"Servo System for Magnetic Recording Based on Time Comparison", IBM Technical Disclosure Bulletin, vol. 23, No. 2, Jul. 1980, pp. 787–789, Gruss et al.

Primary Examiner—George G. Stellar
Attorney, Agent, or Firm—Thomas R. Berthold

[57] ABSTRACT

An improved servo control system for data track following of the read/write head in a magnetic recording system uses a pattern of segments of servo information slanted across the data tracks. The time of flight of the servo segment from occurrence of a reference pulse until the peak servo signal is read by the head is an indication of the position of the head in a direction perpendicular to the desired track. This time is compared with the known time of flight if the head were precisely over the centerline of the desired track and the time difference is used to generate a control signal to position the head over the track centerline. In an embodiment where each segment is slanted across only one track, the reference pulse is the beginning of the servo signal and the time measurement is the number of fixed frequency magnetic transitions read by the head in the servo segment. When the system is used in flexible disk drives, the servo segments are written in one of the data sectors on the flexible disk by the user's disk drive.

13 Claims, 5 Drawing Figures

SERVO CONTROL SYSTEM USING SERVO PATTERN TIME OF FLIGHT FOR READ/WRITE HEAD POSITIONING IN A MAGNETIC RECORDING SYSTEM

TECHNICAL FIELD

This invention relates to servo control systems for read/write head positioning in magnetic recording systems. In particular the invention is directed to a servo control system for data track following of the head in a magnetic recording disk file in which the time of flight of the servo pattern on the disk is indicative of the position of the head relative to the desired data track and is used to position and maintain the head over the centerline of the desired data track.

BACKGROUND OF THE INVENTION

In order to substantially increase the track density in magnetic recording disk files (or "drives"), it is necessary to incorporate a servo control system to center and maintain the head over the tracks during read or write operations. The movement of the head to a desired track is referred to as track accessing or "seeking", while the maintaining of the head over the centerline of the desired track during read or write operations is referred to as track "following". While the need for a servo control system for track following exists in any disk file with a relatively high track density, it is especially critical in the case of flexible disks because such disks are subject to nonuniform distortion due to temperature and humidity changes, spindle motor runout and other effects.

There are several known servo control techniques which utilize the "time of flight" of various servo patterns past the read/write head to indicate the position of the head relative to the centerline of the desired track. In one such technique, as disclosed in U.S. Pat. No. 3,812,522 to Kimura, et al., the servo signals for a group of data tracks are angularly staggered so that the time between a reference pulse and a servo signal in the desired track identifies that track within the group of tracks. This technique is used on disk files using a rigid disk which incorporates prerecorded servo signals on equally angularly spaced sectors which extend out radially from the disk center. As the disk rotates, the head receives sampled track position signals as the servo sectors pass beneath the head. While the use of prerecorded sector servo signals and the technique taught by Kimura to utilize those sector servo signals are applicable to rigid disk files, they are not generally suitable for use with flexible disk drives because flexible disks are generally available only in unrecorded form. Any recording of servo information in angularly spaced sectors would significantly increase the cost of the flexible disks. Furthermore, the time required to record servo information in multiple sectors on each data track would be prohibitive if recorded by the user's disk drive.

U.S. Pat. No. 4,149,198 to Behr, et al., discloses a disk file head positioning system which utilizes two dedicated servo tracks and associated dedicated positioning servo heads radially spaced on opposite sides of the read/write head. The servo heads and the information recorded in the servo tracks are both slanted relative to the tracks. The time of arrival of pulse trains caused by the two servo heads reading servo information on their respective servo tracks are combined to generate a signal indicative of the position of the read/write head relative to the data tracks.

An article entitled "Servo System for Magnetic Recording Based On Time Comparison" by E. G. Gruss, et al., *IBM Technical Disclosure Bulletin*, Vol. 23, No. 2 (July 1980), pp. 787-789, discloses the use of intersecting servo markings slanted relative to the data tracks. A comparison of the times of intersection of the head with the servo markings indicates the position of the head relative to the track centerlines.

U.S. Pat. No. 4,346,413 to Hack, U.S. Pat. No. 4,454,549 to Pennington and U.S. Pat. No. 4,488,187 to Alaimo all disclose servo patterns slanted relative to the tracks and various means, other than time of flight measurement, to determine the position of the head relative to the track centerlines.

Co-pending application Ser. No. 713,139, assigned to the same assignee as this application, discloses the use of a servo pattern comprising a group of servo segments slanted relative to the data tracks in which each segment consists of magnetic transitions which increase in frequency in the radial direction. The position of the head relative to the centerline of the desired data track is determined not by the time of flight of the servo segment, but by the number of magnetic transitions actually read by the head.

SUMMARY OF THE INVENTION

The present invention is a track following servo control system in a magnetic recording system and utilizes an improved time of flight technique of a slanted servo pattern to determine the position of the read/write head relative to the centerline of the desired data track.

The servo pattern comprises a plurality of segments of servo information which are spaced apart in a direction perpendicular to the tracks and slanted relative to the tracks. As the recording medium moves past the head, the measured time from a reference pulse to the peak signal read by the head from the slanted servo segment in the desired track is indicative of the position of the head in a direction generally perpendicular to the track. This measured time is used by the servo control system to command the head actuator to position the head toward the track centerline. While each servo segment may be slanted across more than one data track, in an embodiment in which each servo segment spans only one data track the reference pulse is the servo signal above a predetermined threshold. In this embodiment the measured time is essentially the time from the beginning of the servo signal to the peak amplitude of the servo signal.

In an embodiment especially applicable to flexible disk drives, the slanted servo segments each comprise magnetic transitions of a single frequency and are written on the flexible disk by the user's disk drive prior to the recording of data.

For a fuller understanding of the nature and advantages of the present invention, reference should be made to the following detailed description taken in conjunction with the accompanying drawings.

BRIEF DESCRIPTION OF THE DRAWINGS

FIG. 4A shows a slanted servo segment covering only one data track and five positions of the head within the data track; and.

DESCRIPTION OF THE PREFERRED EMBODIMENTS

Figure 1:
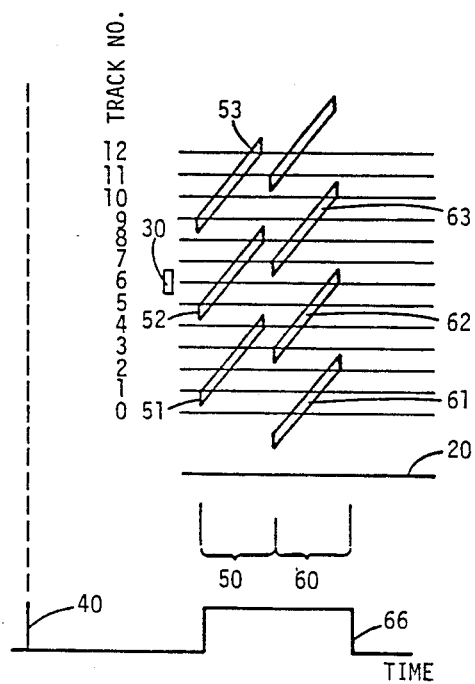
FIG. 1 is an illustration of the pattern of slanted servo segments on a portion of a magnetic recording disk.

Referring first to FIG. 1, the pattern of servo information utilized in the present invention is illustrated on a portion of a data disk in which, for convenience in explanation, portions of the concentric circular data tracks are represented as straight lines. The portion of the disk shown in FIG. 1 has an outside diameter 20, and a plurality of data tracks, represented by data track centerlines 0 through 12. The last data track (not shown) is located close to the inside diameter of the disk. Also shown in FIG. 1 is a representation of a read/write head 30 shown centered on track 6.

The servo information recorded on the disk in FIG. 1 is identified as representative segments 51, 52, and 53 which are located within band 50, and representative segments 61, 62, and 63 which are located within an adjacent angularly spaced band 60. Bands 50 and 60 occur within a specific time gate 66 during rotation of the disk. In the case of a flexible disk, there are typically 8 or 9 data sectors angularly spaced around the disk and formatted on the blank disk by the disk drive before the disk is used. Thus, when the servo pattern of the present invention is used with flexible disk drives, the servo segments (and time gate 66) preferably occur in only one of the data sectors. Each of the segments of servo information is slanted relative to the tracks and, in this example, spans the centerlines of two adjacent tracks. For example, segment 51 in band 50 provides servo information for positioning the head at the centerline of either track 2 or 3, and segment 62 in adjacent band 60 provides information for positioning the head at the centerline of either track 4 or 5. In the example of FIG. 1, the open-loop tolerance of the head positioning means, which may be a finely calibrated stepper motor, is at least plus or minus one-half track. Thus if the head 30 were commanded to move to track 2 the stepper motor has sufficient accuracy to position the head within one-half track of the track 2 centerline. The information contained in each of the servo segments consists of magnetic transitions of a single frequency, which is the same for each track.

The method of writing a typical servo segment, such as segment 52, will now be explained. When the disk is rotating at its operating speed, current pulses of a constant frequency are applied to head 30. Simultaneously, the disk file stepper motor (not shown) moves the head 30 in a radially inwardly direction with a constant velocity when the sector of the disk containing the segments of servo information is beneath the head, i.e. at the beginning of time gate 66. The head 30 thus writes the servo segment 52 on the disk. With each occurrence of time gate 66, i.e. with each rotation of the disk, a new servo segment in band 50 is written in this manner. When all of the servo segments in band 50 are written on the disk, the servo segments in band 60 are written in a similar manner, the difference being that the writing of the segments in band 50 occurs after a short time delay within time gate 66 to permit band 60 to be angularly spaced from band 50. The frequency of the signal can be selected to be between the 1F and 2F operating frequencies of the disk file, which in the case of one type of conventional flexible disk drive corresponds to a 1F frequency for "all zeros" of 125 Khz and a 2F frequency for "all ones" of 250 Khz. While in this method of writing the servo segments only one servo segment is written per revolution of the disk, if the bands 50 and 60 are separated by a short time delay then two servo segments, for example segments 51 and 62, can be written in one pass of the servo sector past head 30. In addition, the servo segments could be divided into more than two bands within the servo sector.

Also depicted in FIG. 1 is a reference pulse 40 on the same time scale as time gate 66. The reference pulse 40 is used to start a counter which measures the time from occurrence of the reference pulse to the peak amplitude of the servo signal read by head 30. In the case of a flexible disk drive, the reference pulse may be the index pulse generated by rotation of the spindle motor. Alternatively, the beginning of the data tracks on the disk may contain a signal which is read by the head to generate the reference pulse.

Figure 2:
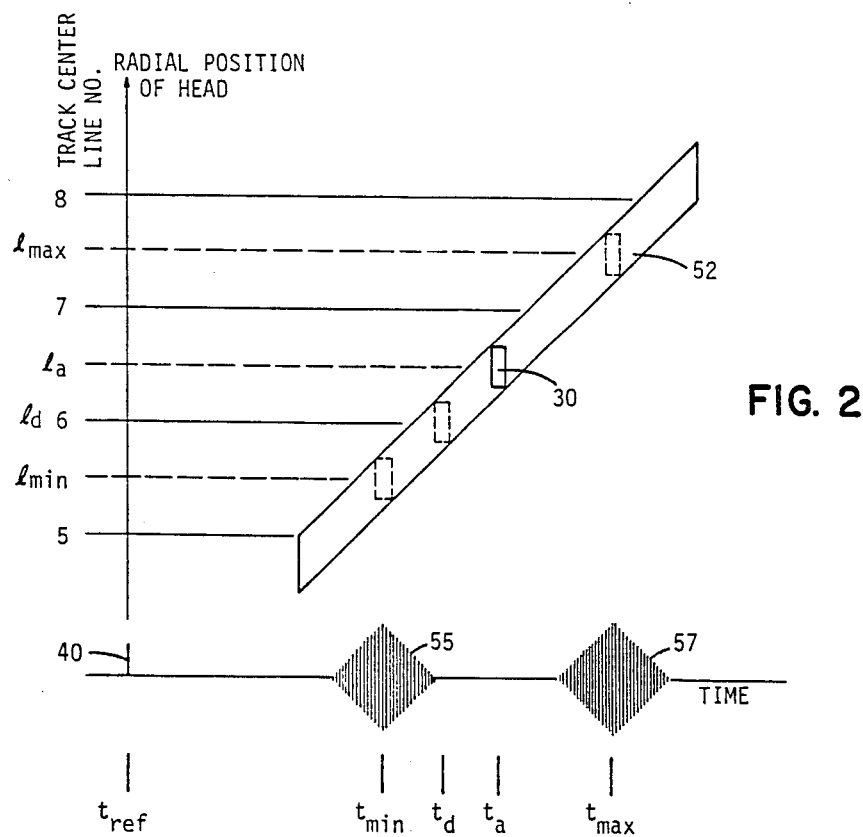
FIG. 2 is an illustration of one slanted servo segment showing the head at various radial positions within the segment and a time scale showing the reference pulse and the times of peak servo signal for the head at these radial positions.

The function of reference pulse 40 in the time of flight servo technique of this invention may be better understood by reference FIG. 2. As shown in FIG. 2 a typical servo segment 52 is shown slanted across the centerlines of tracks 5, 6, 7 and 8. The servo segment 52 is used only when centering the head over either track 6 or track 7, since it is assumed for purposes of this explanation that the open-loop tolerance of the head positioning means, e.g. a stepper motor, is one-half track. Thus the maximum excursion of head 30 radially within segment 52 would be midway between tracks 5 and 6 and midway between tracks 7 and 8, as shown by positions $1_{min}$ and $1_{max}$, respectively. The time scale of FIG. 2 shows occurrence of the reference pulse at tref and occurrence of the peak amplitude of the servo signal for the position of head 30 at the minimum and maximum radial locations within segment 52 as $t_{min}$ and $t_{max}$, respectively. The time occurrences $t_{min}$ and $t_{max}$ are shown at the peak of signal envelopes 55 and 57 which are representative of the output of the read/write head amplifier in the manner explained below.

Figure 3:
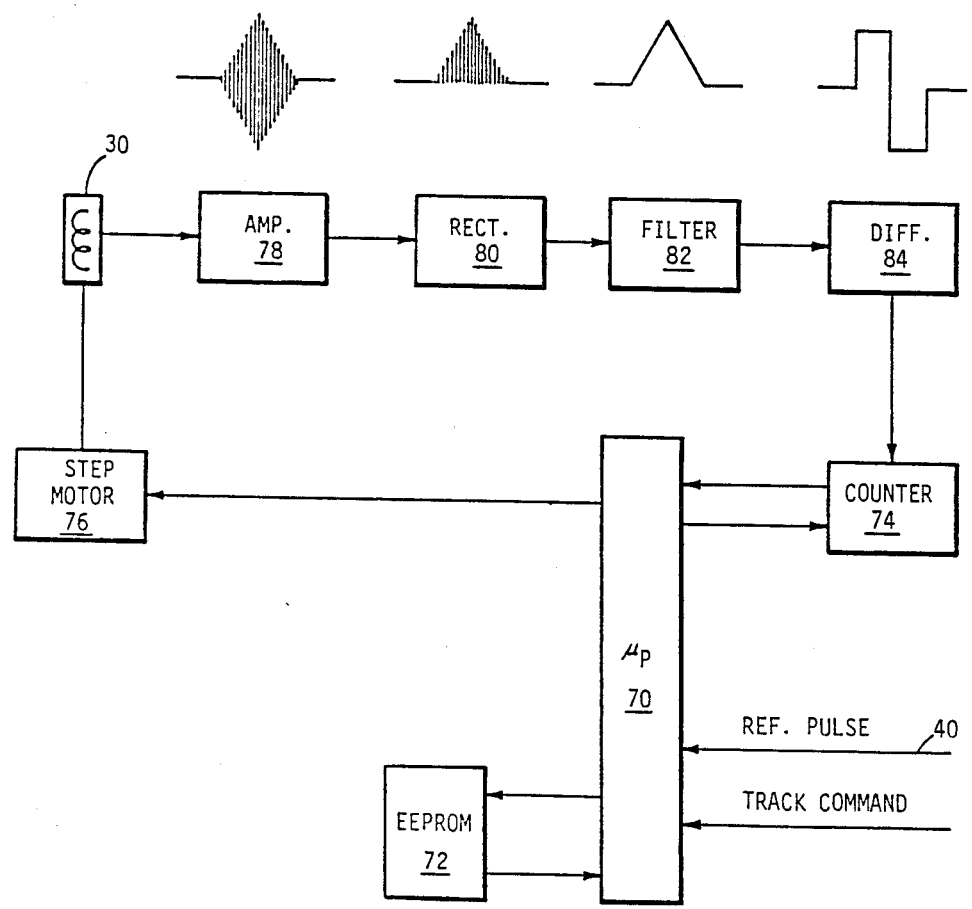
FIG. 3 is a block diagram of the servo control system showing the means for measuring the time from a reference pulse to the peak amplitude of the signal from a slanted servo segment.

Referring now to FIG. 3, a block diagram depicts the circuitry required to correctly position the head 30 to the centerline of the desired track in response to the measured time of the peak servo signal from reference pulse 40. The disk file incorporating the improved servo control system of this invention includes a microprocessor 70, a suitable memory device such as an electrically erasable programmable read only memory (EEPROM) 72, a timer or counter 74, stepper motor 76, read/write head 30, readback signal amplifier 78, rectifier 80, filter 82, and differentiator 84. Also depicted in FIG. 3 above amplifier 78, rectifier 80, filter 82 and differentiator 84 are signal waveforms representative of the outputs of each of those respective circuit elements. The microprocessor 70 is connected by suitable address and bus lines to EEPROM 72 and receives an input from counter 74. Other inputs to microprocessor 70 are the reference pulse 40 (which in the example of a flexible disk drive is the index pulse from the spindle motor) and a track command signal from the data controller (not shown) which is an indication of the desired data track.

The operation of the improved servo control system can be understood by considering the function of the above-described components during operation with reference to FIGS. 2 and 3. For purposes of this explanation, it will be assumed that it is desired to maintain head 30 over the centerline of track 6. The data controller first signals microprocessor 70 with the identification of the desired track, namely track 6. The microprocessor 70, based upon the known present track location of head 30, then commands the stepper motor 76 to step a predetermined number of microsteps, based upon the calibration of stepper motor 76, in order to reach track 6 centerline. Typically this track seeking is performed open-loop, i.e. without any servo feedback. After the stepping has been completed and head 30 is at track 6 within the half-track tolerance the index pulse is received by microprocessor 70 as the disk rotates. Upon receipt of the index pulse, microprocessor 70 then starts counter 74 to begin timing. When servo segment 52 passes head 30, the signal read by head 30 is amplified by amplifier 78 which produces an output waveform similar to that shown in FIG. 3 above amplifier 78. The amplified signal is then rectified by rectifier 80 and filtered by filter 82. The signal is next differentiated by differentiator 84 which produces the digital pulse shape shown in FIG. 3 above differentiator 84. The step change of the differentiated pulse from negative to positive occurs at the peak signal amplitude read by head 30 from the passing servo segment 52 and is output to counter 74 to stop the timing measurement. For purposes of this example, let it be assumed that the head 30 has been positioned by stepper motor 76 to the actual radial position $1_a$, as shown in FIG. 2. In that case the peak readback signal will occur at time $t_a$, as shown in FIG. 2. The desired time, $t_d$, corresponds to the time of occurrence of the peak signal if head 30 were precisely over the centerline of track 6. The microprocessor 70 then reads the value stored in counter 74, which corresponds to the time $t_a$, and computes the difference $t_a - t_d$, which corresponds to a value of head position error. Microprocessor 70 then addresses a lookup table in EEPROM 72 to determine the number of microsteps needed to generate a control signal to cause stepper motor 76 to center the head 30 over the centerline of track 6. The lookup table stored in EEPROM 72 is merely a compilation of microstep values, each microstep value corresponding to a particular value of time difference, $t_a - t_d$. In the preferred embodiment there is only one sector of servo information on the disk so that the above-described time of flight track centering procedure occurs once per revolution of the disk. The procedure is repeated until the head is centered over track 6, which typically occurs within one disk revolution.

Figure 4A:
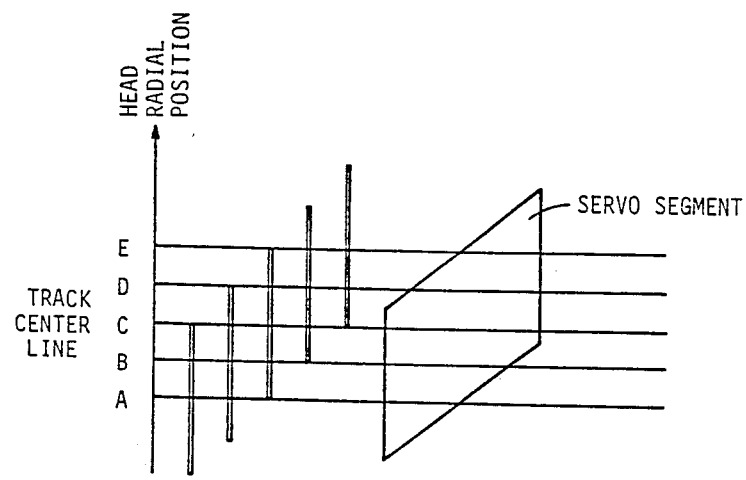
Figure 4B:
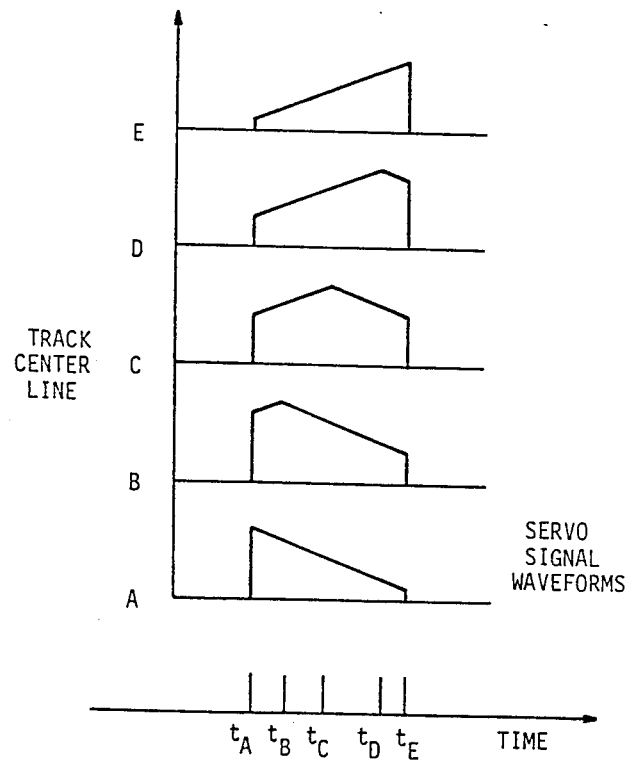
FIG. 4B is an illustration of the servo signals read by the head at the five radial positions shown in FIG. 4A.

Referring now to FIGS. 4A and 4B, an embodiment of the present invention is shown in which each slanted servo segment spans only one track. Such a servo segment is shown with five different radial positions of head 30 designated "A" through "E". The difference between the single track servo segment of FIG. 4A and that of a servo segment which spans more than one track, such as the segment 52 in FIG. 2, is that with the single track segment there is only one possible radial position for head 30 where a completely symmetric readback signal from amplifier 78 can occur. Each of the five different radial positions, A through E, will result in the corresponding signal out of filter 82 (FIG. 3) as shown in FIG. 4B. The single track servo pattern is usable only with disk files which have head actuator open-loop tolerances of less than one-half track. Thus, if head 30 is commanded to the centerline of the track it will be actually positioned somewhere between radial positions A and E. The desired time occurrence of the peak signal amplitude is $t_C$, as shown in FIG. 4B, which corresponds to the track centerline.

One of the advantages of the single track slanted servo segment is that an external reference pulse is not required. This is because the leading edge of the pulse from differentiator 84 can be used to trigger the start of counter 74. The crossing of the differentiator 84 pulse from negative to positive stops counter 74. The leading edge of the differentiator 84 pulse, i.e. the first signal from the servo segment read by head 30 which is above a predetermined threshold, indicates the time when the servo segment is essentially first aligned with head 30. The use of this time as the reference pulse is not possible with a servo segment which spans more than one track since the signal profile shown at position C of FIG. 4B could occur at more than one radial position in such a segment.

With the use of single track servo segments the magnetic transitions recorded within each servo segment can function as the counter, thus eliminating the need for an external timer, such as counter 74. For example, if the head were located at radial position C in FIG. 4A the head 30 would read all the transitions in the servo segment above a predetermined amplitude threshold. The amplifier 78 would then provide a separate digital output to a register (not shown) which would continue until the differentiator 84 terminated the input to the register when the peak signal was read. The value in the register would be accessed by microprocessor 70 and used to determine the control signal to the head actuator in the manner previously described.

While the invention has been described with specific application to magnetic recording disk files and in particular to flexible disk drives, the basic concept of the invention is fully applicable to other types of recording systems, such as magnetic tape drives.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a magnetic recording data storage system having a head and means attached to the head for moving the head near a selected data track on the recording medium prior to the reading or writing of data, an improvement to the system comprising:

a group of segments of servo information recorded on the medium and spaced from one another in a direction generally perpendicular to the data tracks, each segment extending over at least one track and being slanted relative to the tracks;

means for generating a reference pulse indicative of the position of the head relative to the group of servo information segments in the direction along the data tracks;

means coupled to the reference pulse generating means and to the head for measuring the time from receipt of the reference pulse to the peak amplitude of the signal read by the head from one of the slanted segments of servo information; and means coupled to the time measuring means and the head moving means for commanding the head moving means to position the head to the centerline of the selected data track in response to the measured time.

2. The improved system according to claim 1 wherein alternate slanted segments of servo information are located within a first band in a direction generally perpendicular to the data tracks and the remaining slanted segments are located within a second band in a direction generally perpendicular to the data tracks, the second band being spaced along the tracks from the first band.

3. The improved system according to claim 1 wherein each segment of servo information extends over only one track and comprises magnetic transitions of a single frequency and wherein the time measuring means further comprises means for counting the number of magnetic transitions read by the head.

4. The improved system according to claim 3 wherein the reference pulse generating means further comprises means for sensing when the head first reads a signal above a predetermined threshold level from one of the segments of servo information.

5. The improved system according to claim 1 further comprising means for recording the segments of servo information on the medium.

6. An improved system according to claim 1 wherein the magnetic recording data storage system is a disk file having a recording disk with multiple concentric data tracks and wherein the group of servo segments are radially spaced on the disk.

7. The improved system according to claim 6 wherein the reference pulse generating means includes means for generating an index pulse indicative of the beginning of the data tracks on the disk.

8. The improved system according to claim 6 wherein each slanted segment of servo information extends over only one track, wherein radially alternate segments of servo information are located within a first band and the remaining segments are located within a second band angularly spaced from the first band, wherein the reference pulse generating means further comprises means for sensing when the head first reads a signal above a predetermined threshold level from one of the segments of servo information, and wherein the time measuring means further comprises means for determining which of the bands of servo segments is aligned with the head.

9. In a magnetic recording flexible disk drive of the type utilizing a flexible disk with multiple concentric tracks divided into a plurality of angularly spaced data sectors, a read/write head, and means attached to the head for moving the head near a selected track prior to the reading or writing of data, an improvement to the flexible disk drive comprising:

a group of radially spaced segments of servo information recorded on one of the sectors of the disk, each segment extending radially over at least one track, being slanted relative to the track and comprising magnetic transitions of generally a single frequency;

means for generating a reference pulse indicative of the angular position of the head relative to the group of segments of servo information;

means for sensing the peak amplitude of the signal from one of the slanted segments of servo information read by the head;

means for measuring the time from occurrence of the reference pulse to occurrence of the peak servo signal read by the head; and means coupled to the time measuring means and the head moving means for positioning the head to the centerline of the selected track in response to the measured time.

10. The improved flexible disk drive according to claim 9 further comprising means coupled to the head for writing the segments of servo information in one of the data sectors on the disk, said writing means including means for providing to the head a write signal of a generally constant frequency as the head moves radially.

11. The improved flexible disk drive according to claim 9 wherein the reference pulse generating means further comprises means for generating an index pulse indicative of the beginning of the data tracks on the disk.

12. The improved flexible disk drive according to claim 9 wherein the reference pulse generating means further comprises means for generating a reference pulse when the signal from one of the segments of servo information read by the head first reaches a level above a predetermined threshold.

13. The improved flexible disk drive according to claim 12 wherein the time measuring means includes means for counting the number of magnetic transitions read by the head in the servo segment.

* * * * *

UNITED STATES PATENT AND TRADEMARK OFFICE
CERTIFICATE OF CORRECTION

PATENT NO. : 4,598,327

DATED : July 1, 1986

INVENTOR(S) : Shen Jen and William J. Kabelac

It is certified that error appears in the above-identified patent and that said Letters Patent is hereby corrected as shown below:

Column 4, line 38, "$l_{min}$" should be --$l_{min}$-- and should not be placed in bold type.

Column 4, line 39, "$l_{max}$" should be --$l_{max}$-- and should not be placed in bold type.

Column 5, line 27-28, "negative to positive" should be --positive to negative--.

Column 6, line 13, "negative to positive" should be --positive to negative--.

Signed and Sealed this

Fourth Day of November, 1986

[SEAL]

Attest:

DONALD J. QUIGG

Attesting Officer

Commissioner of Patents and Trademarks